Figure 1:
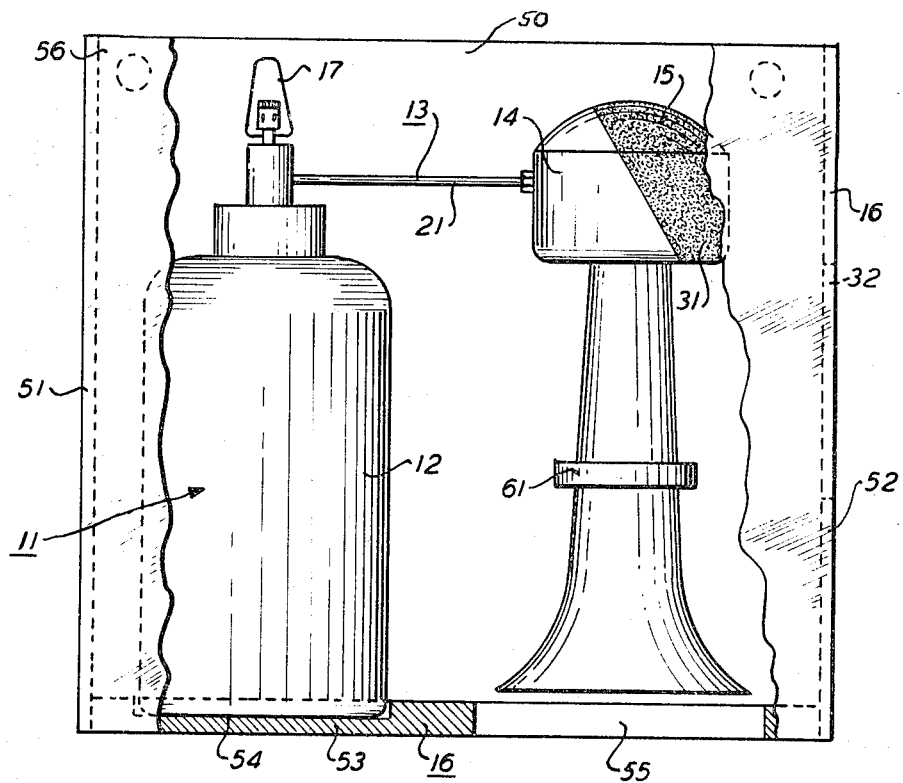

United States Patent

[11] 3,540,408

[72] Inventor Willard C. Messick
 P.O. Box 1273, Cortland, New York
[21] Appl. No. 763,170
[22] Filed Sept. 27, 1968
[45] Patented Nov. 17, 1970

[54] INDICATOR ALARM DEVICE
 7 Claims, 6 Drawing Figs.
[52] U.S. Cl. ................................................. 116/114,
 116/106, 116/112
[51] Int. Cl. .................................................... G01d 21/00
[50] Field of Search ........................................ 116/65, 67,
 101, 106, 112, 114; 73/296; 222/41, 164; 248/325,
 364, 146; 312/234

[56] References Cited
UNITED STATES PATENTS

| | | | |
|---|---|---|---|
| 2,575,110 | 11/1951 | Kerr | 73/296X |
| 2,580,041 | 12/1951 | Neilson | 248/146 |
| 2,707,930 | 5/1955 | Miles | 116/114 |
| 2,778,330 | 1/1957 | Jacoby | 116/106 |
| 2,819,139 | 1/1958 | Stevenson | 312/234 |
| 2,841,108 | 7/1958 | Phillips | 116/114 |
| 3,079,886 | 3/1963 | Green | 116/106 |

Primary Examiner—Louis J. Capozi
Attorney—Sommers and Sommers

ABSTRACT: In a heat sensitive gravity alarm device, a support member and horn member having structural features such as to enable visual detection and observation on escape of generally nonsolid substances from the device.

Patented Nov. 17, 1970 3,540,408

Sheet 1 of 2

INVENTOR
W. C. MESSICK

BY
Sommers & Sommers
ATTORNEYS

Patented Nov. 17, 1970 3,540,408
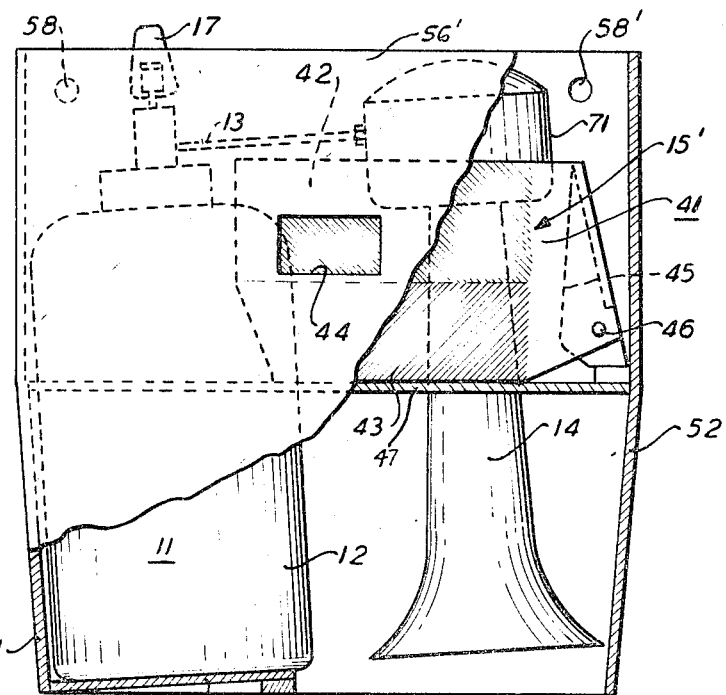
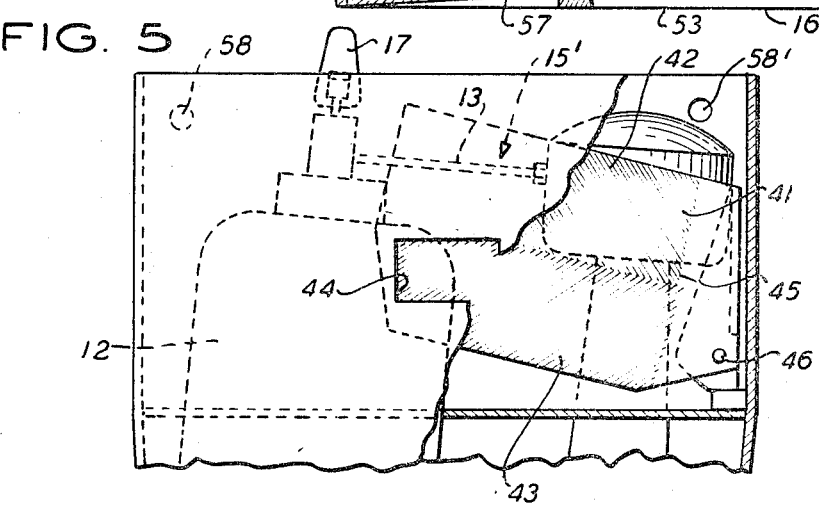
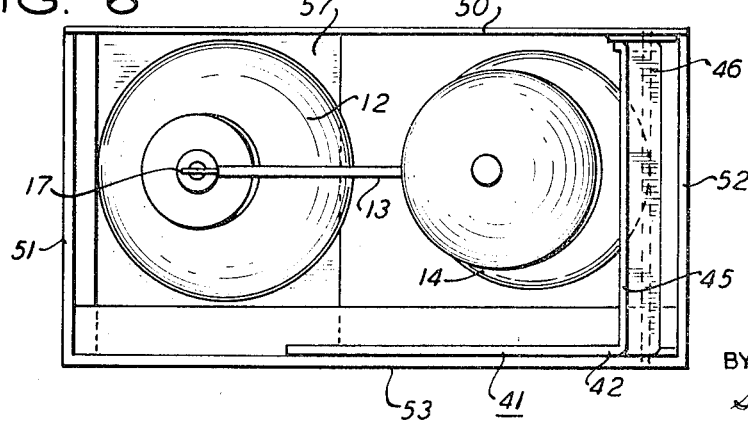
INVENTOR
W. C. MESSICK
BY
Sommers & Sommers
ATTORNEYS

INDICATOR ALARM DEVICE

INDICATOR ALARM DEVICE

This invention relates to a fire alarm device, and more particularly to indicator means to automatically indicate escape of nonsolid substances in the storage container.

Pursuant to the invention, the indicator alarm device has a visual indicator means which provides a simple and accurate indication that the nonsolid substance (*i.e.* gas and/or liquid) in the container has escaped.

Devices proposed for this purpose heretofore have generally been objectionable due to their complexity, inefficiency and high cost of initial manufacture, and requirement for substantial maintenance. Devices employed heretofore lacked efficient indicator means for indicating when the nonsolid substance in the storage container for actuating the alarm device had leaked, such as to make the device inoperable; thus the operator had no means of easily discerning (as visible to the eye across the distance of a room) this defect until it was necessary to use the device under alarm conditions. Discovery of the escape of the nonsolid substance in the alarm device would thus occur too late, often with tragic consequences. These prior devices, therefore, induced a false and tragic sense of safety and security in the user. These and other objections to devices heretofore proposed, have been eliminated in the indicator alarm device of this invention.

Figure 2:
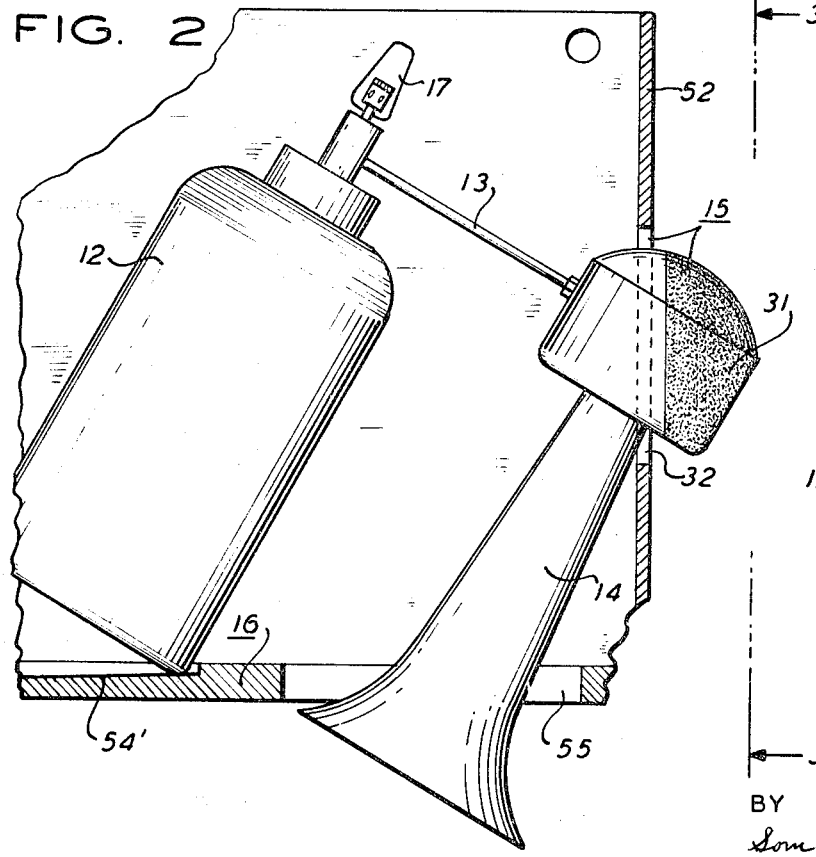
Figure 3:
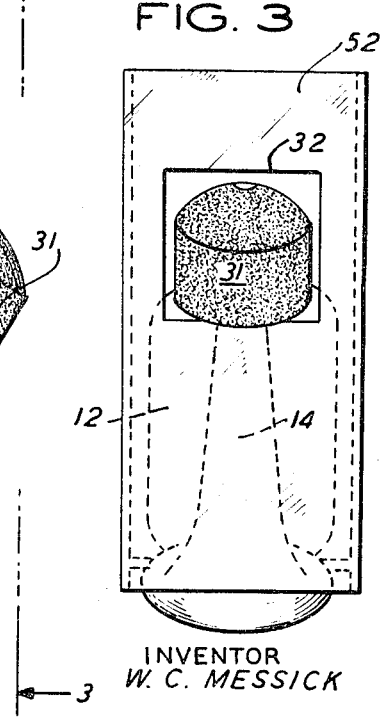

In the drawings, wherein similar characters indicate like parts,

FIG. 1 is a front, partly broken, elevational view, a showing an indicator alarm device embodying the invention in fully loaded condition, FIG. 2 is a fragmentary similar view thereof, in lost-substance condition, FIG. 3 is an end elevational view, taken on line 3–3 of FIG. 2, FIG. 4 is a front, partly broken view of another embodiment of a fully-loaded indicator alarm device pursuant to the invention, FIG. 5 is a fragmentary front partly broken sectional view of the embodiment in lost-substance condition, and FIG. 6 is a top view thereof.

As will be seen from the drawings, this invention relates to an indicator alarm device operating, as will be described below, with reference generally to FIG. 1, so that, in normal operation, the detector member will pick up the ambient heat, concentrate same on a fuse portion, and melt said fuse portion, thereby enabling the gas to actuate the alarm as by flowing through the horn, and so that, if the nonsolid substance in the container leaks out, the device will tilt, bringing an indicator means into view, thereby signalling that the nonsolid substance in the storage chamber should be replenished or replaced. The term "nonsolid substance" as used herein shall be deemed to include generally gasses or liquids, and by way of example, liquid freon.

The indicator alarm device 11 (FIG. 1) is comprised, for example, of a container 12 (for storing nonsolid substances) interconnection means 13, a horn signal such as member 14, indicator means 15 and 15', support means 16, and detector means 17. The interconnections means 13 (FIGS. 4 through 6) may comprise tube member 21. The indicator means 15 may comprise, for example, (FIGS. 1–3) in a first embodiment, a marked (for example, a painted red line) portion 31 of the horn member 14 and aperture 32 in the support means 16, for passage therethrough (FIG. 2) of the marked portion 31 of horn member 14 on occurrence of the condition below described.

The indicator means 15' (FIGS. 4–6), may comprise, for example, in a second embodiment of the invention, a pivoted shield member 41, having a top portion 42, of one color (green, for example), and bottom portion 43 of a second or contrasting color (red, for example), with an indicator aperture 44 in the support means 16 for viewing the color of the shield and with a bearing portion 45 for the horn member 14 to lean against, and a pivot 46.

The support means 16 (FIG. 1), in one embodiment thereof, comprises side walls 51 and 52, a floor member 53 having recess 54 and opening 55 therein, front wall 56 and a back wall 50.

In another (FIG. 2) embodiment of the invention, the recess 54 is inclined to be elevated at the right portion thereof as noted at 54'. In another (FIG. 4) embodiment there is no recess or opening in the floor member 53 but there is an inclined stand support 57 therein. Apertures 58, 58' are provided for inserting means to secure the device to a wall or support structure. Weight 61 (FIG. 1) on horn 14 may counterbalance the nonsolid substance in container 12.

In operation of the first embodiment (FIGS. 1–3) the indicator alarm device 11 (FIG. 1) for example, is seated in or on the support means 16; container 12 thereof may be positioned in the recess 54. As the room temperature increases (for example, by virtue of a fire) the detector 17 will pick up the ambient heat and transmit it to melt a fuse (not shown) normally blocking the flow of gas through means 13, thereby sounding the alarm.

Visual detection of the escape of the nonsolid substance employed to operate the horn is accomplished by the indicator means 15. On escape of the nonsolid substance in the container 12, (due to breakdown of gas structure or leakage of gas) the container 12 will tilt out of its rest position in the recess 54, due to the over-balancing weight of the horn member 14 (and the weight 61 in FIG. 1), the entire indicator alarm device tilting. Portions of the horn member 14 will then extend through the aperture 32 (and through the opening 55) until the marked portion 31 (marked to thereby indicate critical escape of nonsolid substance), is visible outside the edges of the support member 16. On sighting of the indicator means 31 beyond the edge of the side wall 52, the attendant will be alerted that the nonsolid substance in the storage container 12 is inadequate for the purpose of sounding the alarm and that the container nonsolid substance supply should be replenished or replaced. This allows discovery of such loss of nonsolid substance properties before the time when the use of the device is absolutely necessary, and thereby prevents tragic consequences from occurring, providing a visible warning of escape of nonsolid substance from the alarm device. To operate the device without use of the weight 61, for example, the same counterbalancing effect can be achieved by producing the recess 54' inclined or elevated at the right (FIG. 2).

In operation of the second embodiment (FIGS. 4–6) the indicator alarm device 11 (FIG. 4), for example, is seated in the support means 16, the container 12 thereof being positioned on the preferably inclined stand support 57. Visual detection of the loss of volume in the nonsolid substance employed to operate the horn is accomplished by indicator means 15'. On loss of nonsolid substance in the container (due to leakage of same) the container 12 will tilt out of its rest position on the inclined stand support 57, due to the overbalancing weight of the horn member 14, and the entire indicator alarm device will (FIG. 5) tilt. The front edge 71 of the horn member 14 will then bear against the bearing portion 45 of the shield member 41 (which is normally restrained on edge 47 for example), causing the shield member 41 to pivot (on pivot 46) so that the bottom portion 43 (colored red, for example) becomes visible through the indicator aperture 44, (FIG. 5); the attendant, sighting the red color, will be alerted that the gas container 12 is inadequate for the purpose of sounding the alarm and that the nonsolid substance supply should be replenished or replaced.

While the foregoing disclosure of exemplary embodiments is made in accordance with the patent statutes, it is to be understood that the invention is not being limited thereto or thereby, the inventive scope being defined in the appended claims.

I claim:

1. A gas actuated indicator alarm device, affording visual detection of leakage of nonsolid operating substances comprising:

a. a container for storing a nonsolid substance;

b. a weight-calculated gas actuated alarm member;

c. conduit means interconnecting said container and alarm member and forming a cantilever support for the alarm member;
d. support member for said container and alarm member;
e. heat responsive detector means for detecting an increase in ambient temperature operatively associated with said conduit means and permitting sounding of the alarm member when a predetermined rise in temperature has been reached; and
f. indicator means, for indicating leakage of nonsolid substance comprising a marked portion, on said alarm member, and an aperture provided in said support member through which said marked portion is visible upon the tilting of the device, in the support means due to the imbalance in weight of said alarm member and said container when leakage or loss of property of gas occurs in said container.

2. A gas actuated indicator alarm device, affording visual detection of leakage of nonsolid operating substances comprising:
a. a container for storing a nonsolid substance;
b. a weight-calculated gas actuated alarm member;
c. conduit means interconnecting said container and alarm member and forming a cantilever support for the alarm member;
d. support member for said container and alarm member;
e. heat responsive detector means for detecting an increase in ambient temperature operatively associated with said conduit means and permitting sounding of the alarm member when a predetermined rise in temperature has been reached; and
f. indicator means, for indicating leakage of nonsolid substance upon the tilting of the device in the support means due to the imbalance in weight of said alarm member and said container said indicator means including a shield member having a marked portion and being pivotally mounted on said support means and having an inwardly inclined flanged portion in the path of said alarm member, and indicator aperture provide in said support member adjacent said shield member so that upon tilting of said device the alarm member contacts the flange portion causing the marked portion to move into registry with said aperture.

3. In an indicator alarm device as described in claim 1, said support means comprising a floor member, having a recess therein and an opening therethrough, and wall members.

4. In an indicator alarm device as described in claim 3, said recess in said floor member being inclined.

5. In an indicator alarm device as described in claim 2, said marked portion comprising a top portion, of a first color, and a bottom portion, of a second color.

6. In an indicator alarm device as described in claim 5, said support means comprising a floor member, wall members, and an inclined support stand on said floor member to support said container.

7. In an indicator alarm device as described in claim 1, a weight positioned on said alarm member thereabout to counterbalance said container in rest position.